United States Patent
Ivanov et al.

(10) Patent No.: US 12,517,210 B2
(45) Date of Patent: Jan. 6, 2026

(54) SYSTEMS AND METHODS FOR RADIO POSITIONING BASED ON A MULTI-SET OF NETWORK NAMES

(71) Applicant: HERE GLOBAL B.V., Eindhoven (NL)

(72) Inventors: Pavel Ivanov, Tampere (FI); Lauri Aarne Johannes Wirola, Tampere (FI); Marko Luomi, Tampere (FI); Henri Nurminen, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 405 days.

(21) Appl. No.: 17/983,371

(22) Filed: Nov. 8, 2022

(65) Prior Publication Data
US 2024/0151806 A1    May 9, 2024

(51) Int. Cl.
*G01S 5/02* (2010.01)

(52) U.S. Cl.
CPC ........ *G01S 5/02521* (2020.05); *G01S 5/0244* (2020.05); *G01S 5/02524* (2020.05); *G01S 5/0252* (2013.01); *G01S 5/02523* (2020.05); *G01S 5/02525* (2020.05)

(58) Field of Classification Search
CPC ............... G01S 5/02521; G01S 5/0252; G01S 5/02524; G01S 5/02523; G01S 5/0244; G01S 5/02525
USPC .................................................. 342/450, 451
See application file for complete search history.

(56) References Cited

U.S. PATENT DOCUMENTS

| | | | |
|---|---|---|---|
| 9,060,284 B2 | 6/2015 | Cho et al. | |
| 10,139,471 B2 * | 11/2018 | Ivanov | G01S 5/02525 |
| 10,175,336 B2 | 1/2019 | Ivanov et al. | |
| 10,520,578 B2 * | 12/2019 | Ivanov | H04W 64/00 |
| 11,076,300 B2 * | 7/2021 | Wirola | H04W 24/10 |
| 11,125,851 B2 * | 9/2021 | Khan | H04W 64/003 |
| 11,221,389 B2 | 1/2022 | Wirola et al. | |
| 11,385,319 B2 * | 7/2022 | Viitala | G01S 5/0252 |
| 11,570,581 B2 * | 1/2023 | Ivanov | G01S 5/02524 |

(Continued)

FOREIGN PATENT DOCUMENTS

| | | | | |
|---|---|---|---|---|
| EP | 3754358 A1 * | 12/2020 | ......... | G01S 5/02525 |
| KR | 20140142361 A * | 12/2014 | ............ | H04W 4/023 |

*Primary Examiner* — Chuong P Nguyen
(74) *Attorney, Agent, or Firm* — Jeffrey R. Moisan; HERE GLOBAL B.V.

(57) ABSTRACT

Disclosed is an approach for obtaining fingerprints that have been collected by at least one mobile device for supporting a positioning of other mobile devices, each fingerprint comprising at least results of measurements on radio signals of at least one communication node at a particular location, communication node names proximate to the particular location, and an area identifier for the particular location; receiving a positioning request that contains at least a multiset of communication node names; selecting a radio model, wherein the radio model selected is based at least in part on the fingerprint and/or the number of communication node names proximate to a fingerprint which match the node names in the positioning request that contains at least a multiset of communication node names; and generating data for a feedback for a user of the at least one computing device based on the selected radio model.

17 Claims, 7 Drawing Sheets

(56) References Cited

U.S. PATENT DOCUMENTS

| | | | |
|---|---|---|---|
| 2011/0039580 A1* | 2/2011 | Wigren | H04W 4/02 |
| | | | 455/456.1 |
| 2012/0072106 A1* | 3/2012 | Han | G01S 5/02524 |
| | | | 701/410 |
| 2015/0133149 A1* | 5/2015 | Kim | G01S 5/02527 |
| | | | 455/456.1 |
| 2015/0312876 A1* | 10/2015 | Syrjärinne | G01S 5/02524 |
| | | | 455/456.1 |
| 2015/0373500 A1 | 12/2015 | Chen et al. | |
| 2021/0025965 A1 | 1/2021 | Ivanov et al. | |
| 2022/0201644 A1* | 6/2022 | Ivanov | H04L 67/52 |
| 2022/0326340 A1* | 10/2022 | Meiyappan | H04W 16/14 |
| 2024/0133995 A1* | 4/2024 | Hirzallah | G06N 3/0895 |
| 2024/0230828 A9* | 7/2024 | Hirzallah | G06N 3/0895 |

* cited by examiner

SYSTEMS AND METHODS FOR RADIO POSITIONING BASED ON A MULTI-SET OF NETWORK NAMES

BACKGROUND

Modern positioning technologies for global cellular services (GSM, WCDMA, TD-SCDMA, LTE, LTE-A, CDMA, NB-IoT, 5G NR, etc.) and non-cellular services (primarily WLAN, but also Bluetooth, Bluetooth Low Energy, UWB (ultra-wide band), etc.) are based on collecting large global databases containing information on cellular and non-cellular signals. A large portion of this data typically originates from users of these positioning technologies. Collection of data in this way, from voluntary users of the service, is known as crowdsourcing.

The data from these users is typically in the form of fingerprints, which contain a location reference and the measurements taken from the radio interfaces (e.g., cellular, Wi-Fi, Bluetooth Low Energy, ultra-wideband, etc.). The measurements may contain various data and metadata about the radio nodes, devices, etc. This data typically gets uploaded to one or more servers, where algorithms generate models of the wireless communication nodes, etc. for positioning purposes based on the fingerprints received from a multitude of the users. Such models may be coverage areas, node positions, radio propagation models, etc. These models may then be transferred back to one or more user terminals for use in position determination, etc.

Privacy is one of the key problems in the positioning solutions mentioned above. This is because the network identifier (e.g., BSSID of a Wi-Fi access point or a Bluetooth beacon) is a unique identifier of the wireless network device. So, if an end user or organization can associate a network device with a person, place, or thing, the user or organization can also associate the network identifier with the physical location of a person, place, etc.

Another problem with the use of unique network identifier-based positioning is that the unique ids may change whenever the network's transmitters are replaced with new ones. This means that the positioning system will not work until the area's radio map has been learned anew. Therefore, positioning technologies that do not rely on unique network identifiers are needed and useful.

SUMMARY

Disclosed is an improved approach for radio mapping. One embodiment may be described a method, performed by at least one apparatus, comprising obtaining fingerprints that have been collected by at least one mobile device for supporting a positioning of other mobile devices, each fingerprint comprising at least results of measurements on radio signals of at least one communication node at a particular location, communication node names proximate to the particular location, and an area identifier for the particular location; receiving a positioning request that contains at least a multiset of communication node names; selecting a radio model, wherein the radio model selected is based at least in part on the fingerprint; and generating data for a feedback for a user of the at least one mobile device or a server based on the selected radio model.

The method above may also include selecting a radio model based additionally, at least in part, on the number of communication node names associated with or contained within a fingerprint which match the node names in the positioning request (that contains at least a multiset of communication node names). This method may also describe the step of generating data for feedback as comprising combing two or more radio models to provide a positioning estimate for a user, wherein the radio models to be combined are selected based at least in part on data from one or more fingerprints. Any of the feedback generated may be used to update one or more radio maps in some embodiments.

The method above may also further comprise estimating values of parameters defining at least one radio model for the at least one communication node based on the obtained fingerprints. This method may yet also further comprise determining a quality of the radio model by determining an uncertainty of the estimated value of at least one of the estimated parameters; and determining a quality of the radio model based on the determined uncertainty of the value of the at least one parameter. This method may also describe the step of determining an uncertainty of a value of at least one parameter as comprising determining an uncertainty of values of a plurality of the parameters, and wherein the quality of the radio model is determined to be high if the uncertainty of each of the values of the plurality of the parameters lies below a predetermined threshold for the respective parameter (or above depending on context).

The method(s) above may also be described as utilizing a fingerprint which comprises at least a location of the communication node; and/or a transmission power used by the communication node; a received signal strength at a predetermined reference distance to the communication node; and/or a path loss exponent for signals transmitted by the communication node; and/or an average path loss of signals transmitted by the communication node.

The method(s) above may also be described as further comprising determining a quality of a set of a plurality of radio models for a particular location for which values of parameters have been estimated, the quality of the set corresponding to a proportion of radio models for the particular site with high quality to a total number of communication nodes for which results of measurements are included in the obtained fingerprints for the particular site. This method may further comprise generating an indication that no further fingerprints have to be collected in case the determined quality of the set of radio models exceeds a predetermined threshold.

The method(s) above may also be yet further described as having the actions enumerated performed in an iterative process, and wherein the apparatus estimates values of parameters of a radio model for the at least one communication node based on a growing number of obtained fingerprints until a predetermined criterion is met.

The method(s) above may also be described as featuring at least one communication node which comprises at least one of at least one terrestrial non-cellular transmitter; and/or at least one access point of at least one wireless local area network; and/or at least one Bluetooth transmitter; and/or at least one Bluetooth low energy transmitter; and/or wherein the at least one apparatus is or belongs to one of the at least one mobile device; and a server that is configured to obtain and process sets of fingerprints from a plurality of mobile devices. In yet another aspect, disclosed is an apparatus including one or more processors, a non-transitory computer readable medium, and program instructions stored on the non-transitory computer readable medium. The program instructions may be executable by the one or more processors to perform any operations described herein, such as any of those set forth in the disclosed method(s), among others.

These methods and others may be further described as also generating data for feedback for a user comprises generating feedback in the form of routing data for a vehicle, pedestrian, biker, etc. Generating data for feedback for a user may also comprise generating feedback in the form of automated vehicle control(s). These methods and others may also further comprise displaying the generated feedback upon an end user device such as a smartphone or tablet, etc. and/or proving the generated feedback to a server.

The system, methods, etc. may yet also be described as obtaining fingerprints that have been collected by at least one mobile device for supporting a positioning of other mobile devices, each fingerprint comprising at least results of measurements on radio signals of at least one communication node at a particular location, communication node names proximate to the particular location, and an area identifier for the particular location; receiving a positioning request that contains at least a multiset of communication node names; selecting a radio model, wherein the radio model selected is based at least in part on the number of communication node names proximate to a fingerprint which match the node names in the positioning request that contains at least a multiset of communication node names; and generating data for a feedback for a user based on the selected radio model.

In yet another aspect, disclosed is a non-transitory computer readable medium having stored thereon instructions executable by processor(s) to cause an apparatus to perform operations described herein, such as any of those set forth in the disclosed method(s), among others.

In yet another aspect, disclosed is a computer program product including instructions which, when the program is executed by a computer, cause the computer to carry out the steps described herein, such as any of those set forth in the disclosed method(s). In other words, the computer program product may have computer-executable program code portions stored therein, the computer-executable program code portions including program code instructions configured to perform any operations set forth in any of the method(s) disclosed herein, among others.

These as well as other features and advantages of the invention will become apparent from the following detailed description considered in conjunction with the accompanying drawings where appropriate. It should be understood, however, that the drawings are designed solely for purposes of illustration and not as a definition of the limits of the present disclosure. It should be further understood that the drawings are not drawn to scale and that they are merely intended to conceptually illustrate one or more of the features described herein. None of the examples shown or discussed herein are limiting on any aspect of the claimed subject matter.

DETAILED DESCRIPTION

Figure 1:
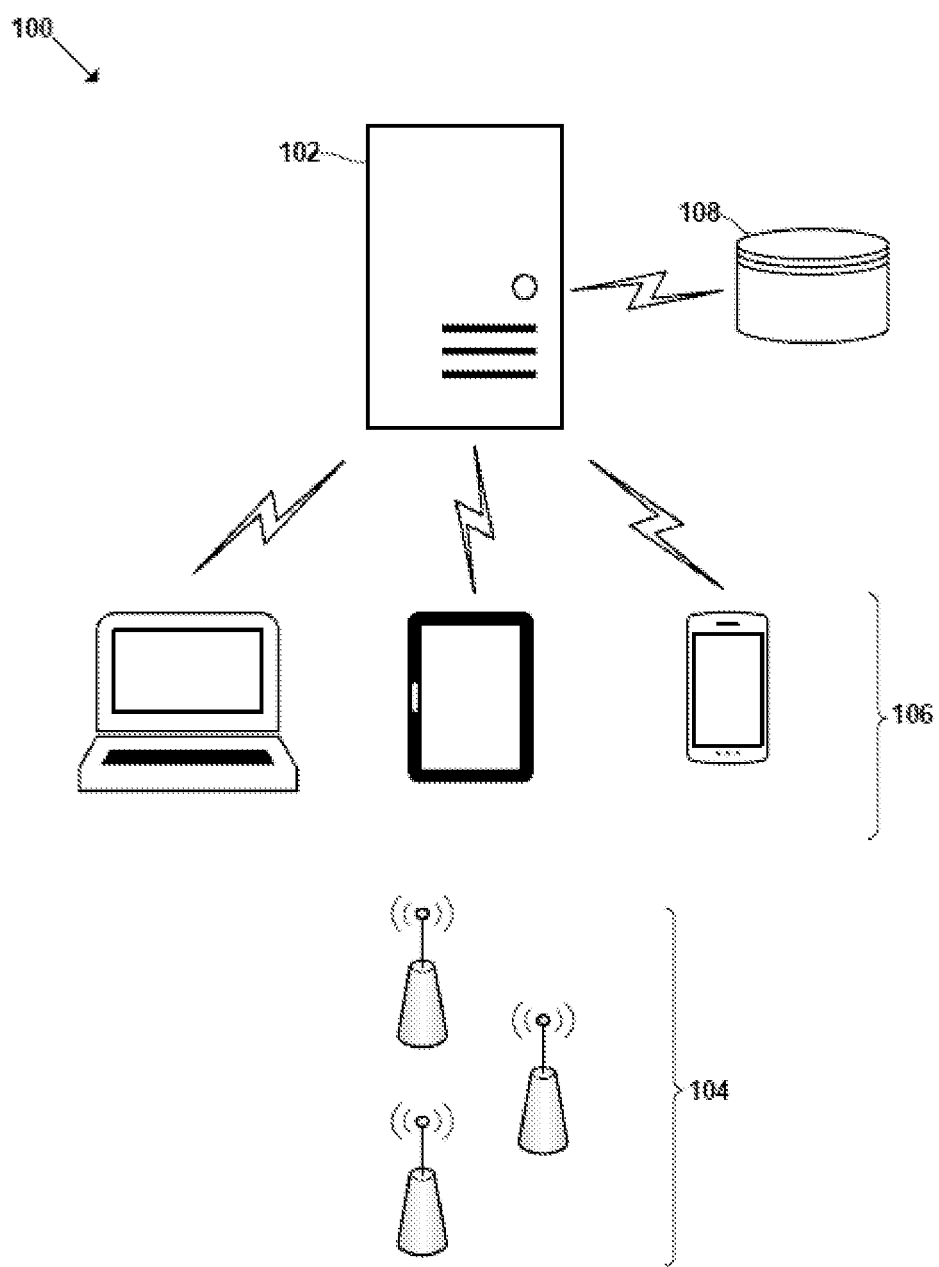
FIG. 1 illustrates an arrangement that may enable a positioning solution, in accordance with an example implementation.

Some embodiments of the present disclosure will now be described in more detail with reference to the accompanying drawings, in which some, but not all, embodiments of the present disclosure are shown. Indeed, various aspects of the present disclosure may be embodied in different forms and should not be construed as limited to the embodiments set forth herein.

I. Example System(s) for Indoor and/or Outdoor Positioning

Positioning methods that are seamless and available at all times might rely upon novel systems and solutions that are specifically developed and, if necessary, deployed for this purpose. Traditional positioning technologies, which are mainly used outdoors (e.g., satellite positioning technologies), cannot always deliver the desired performance that would enable a seamless navigation experience at all times, particularly indoors. For instance, in the case of indoor positioning, satellite-based radio navigation signals simply do not penetrate through the walls and roofs sufficiently for adequate signal reception and cellular signals often have a bandwidth that is too narrow for accurate ranging by default. And in the case of outdoor scenarios, there may be situations where e.g., satellite-based radio navigation provides for insufficient coverage, such as in the event of bad weather or in urban street canyons.

Several dedicated solutions have already been developed and commercially deployed during past years, such as solutions based on technologies like pseudolites (GPS-like short-range beacons), ultra-sound positioning, Bluetooth or Bluetooth LE signals, and wireless local area network (WLAN) and/or other network fingerprinting. What is typical to these solutions is that they tend to involve either deployment of totally new infrastructure (such as beacons or tags) and/or manual exhaustive radio-surveying of streets and buildings, including all the floors, spaces and rooms. Using such solutions may be rather expensive and will likely take a considerable amount of time to build the coverage to the commercially expected level. Also, the diversity of these technologies makes it difficult to build a globally scalable indoor positioning solution, and integration and testing will become complex if a large number of technologies needs to be supported in consumer devices.

A commercially successful positioning solution would likely be globally scalable, have low maintenance and deployment costs, and offer acceptable end-user experience. To facilitate this, the positioning solution can be based on existing infrastructure and on existing capabilities in the consumer devices. For example, the positioning solution could be based on e.g., Cellular network infrastructure, Wi-Fi and/or Bluetooth, which are technologies already supported in numerous devices, such as smartphones, tablets, laptops and even in the majority of the feature phones. Thus, it is advantageous to develop a positioning solution that uses cellular and/or non-cellular radio signals in a way that (i) makes it possible to achieve desired horizontal and vertical positioning accuracy and (ii) provides the ability to quickly build global coverage.

FIG. 1 illustrates an arrangement 100 that may enable a positioning solution, in accordance with example implementations (e.g., systems, apparatuses, methods, user interfaces, etc.). Arrangement 100 could include a server system 102 (could also be referred to as server(s) or the like), radio devices 104 (could also be referred to as radio nodes or the like), one or more mobile devices such as mobile devices 106, and a database 108. The server system 102, radio devices 104, mobile device(s) 106, and/or database 108 may be configured to communicate with one another via one or more communication links (e.g., via a cellular and/or a non-cellular communication network).

As an initial matter, a mobile device could be any electronic device that is movable from one position to another. For example, the mobile device(s) 106 could be or otherwise include cellular phone(s), personal digital assistant(s), a laptop computer(s), tablet computer(s), and/or wearable device(s), among other options. In some cases, a mobile device could also be referred to as a handheld device or a user device, among other possibilities.

Further, radio devices 104 may include any type of device that is configured to emit (and optionally receive) radio signals. For example, the radio devices 104 could include wireless WLAN access point(s), such as a WLAN access point that supports or is otherwise configured according to the IEEE 802.11 standard (e.g., a Wi-Fi access point). Additionally or alternatively, the radio devices 104 could include Bluetooth beacon(s) and/or cellular network node(s) (e.g. Global System for Mobile Communications (GSM), Universal Mobile Telecommunications System (UMTS), Long Term Evolution (LTE), and/or 5G base station(s)), among other options.

Furthermore, server system 102 could take various forms without departing from the scope of the present disclosure. By way of example, server system 102 could include a single server or a plurality of servers (e.g., forming a server cloud). Moreover, server system 102 could be embodied as a positioning server of a positioning system, such as of a non-GNSS based radio positioning system for indoor and/or outdoor positioning.

In practice, a non-GNSS based radio positioning system could include or otherwise rely on radio devices (e.g., radio devices 104) to support the positioning solution described herein. Such radio devices may include dedicated radio devices (e.g., Bluetooth beacons) that are installed in the environment for which the positioning solution is provided. Additionally or alternatively, the non-GNSS based radio positioning system could make use of existing radio devices, such as WLAN access points and/or cellular network nodes. In any case, the radio devices could be deployed in particular area(s), which may be indoors and/or outdoors.

Given this arrangement 100, the server system 102 could generate and/or update a radio map for an area, which may in turn enable position estimations for mobile device(s) in the area. Namely, the radio map could enable an entity (e.g., a server system or a mobile device) to determine characteristics of radio signals (e.g., transmitted by radio devices) that are expected to be observable respectively at different locations in the area. Accordingly, the term radio map may refer to any collection of data that provides location-linked information on a radio environment.

To help facilitate generation or updating of a radio map, server system 102 could collect "fingerprint(s)" from mobile device(s). A fingerprint collected from a given mobile device may contain or otherwise represent measurement(s) by the mobile device and a position estimate (for geo-referencing e.g., radio data collected by the mobile device). The position estimate may be, for example, based on GNSS data, sensor data, and/or previously collected radio measurements, or may be manually inputted via a user interface. And the measurements may include, for example, radio signal parameter(s) of observed radio signals measured by a mobile device and/or identifiers of radio device(s) that emitted the observable radio signals, among others. In more specific examples, collected fingerprint(s) may respectively contain any feasible combination of the following types of measurements: global and/or local identifier(s) of cellular network node(s), Wi-Fi access point identifier(s), beacon identifier(s), SSID names, physical location data, signal strength measurement(s) (e.g., Received Signal Strength (RSS)), pathloss estimate(s), timing measurement(s) (timing advance or round-trip time), speed data, reference position measurement technology, collection device information, battery level data, and/or environment sensor data etc. Other examples are also possible.

In some implementations, collected fingerprints could enable generating or updating of a radio map for a 3D positioning solution e.g., in multi-level buildings. In particular, features of radio signals (e.g., received signal strength) that may be used for horizontal positioning may vary significantly from one building layer to another in different altitude levels at the same horizontal position, often due to the radio signal attenuation caused by a building's structure. This might affect the eventual performance of a radio-based positioning system. Therefore, it would be particularly beneficial for a radio map to indicate characteristics of radio signals that are expected to be observable respectively at different attitudes/floors (physical location data of devices) of a multi-level building.

Given this, collected fingerprint(s) could additionally or alternatively include data representing or otherwise enabling determination of altitude(s) of mobile device(s). In particular, fingerprint(s) may include altitude data representing absolute and/or relative altitude(s) of a mobile device. Additionally or alternatively, fingerprint(s) may include pressure data representing pressure measurements, and such pressure data can be used to determine altitude(s) and/or altitude changes, e.g., according to a predictable relationship between pressure and altitude.

In practice, there may be various approaches for determining or otherwise generating altitude data. In one example, altitude data could be determined according to GNSS-based altitude estimate(s), which may work relatively well outdoors in good signal conditions, but may be unavailable or inaccurate indoors. In another example, altitude data could be determined according to an altitude map representing altitudes respectively at different locations. In yet another example, a barometer (e.g., in a mobile device) may provide altitude/pressure data (e.g., pressure measurements) that can be used to estimate or determine altitude changes of a mobile device. In this regard, reference altitudes, which may be GNSS-based and/or based on an altitude map, could be used in combination with altitude changes determined according to barometer measurements, so as to determine new altitude(s) of a mobile device. Other examples are also possible.

Generally, altitude data in a given fingerprint could represent altitude(s) of a mobile device substantially at the time the mobile device observed or otherwise determined certain (e.g., radio) measurements. For instance, a mobile device could provide, to server system 102, a fingerprint including radio measurement(s) by the mobile device and altitude data representing an altitude of the mobile device substantially during the radio measurement(s). And if the server system 102 has information indicating respective altitude(s) of floor(s) in a building, the altitude data in the fingerprint could be used to determine floor(s) at which the radio measurement(s) were performed. As such, server system 102 could associate certain altitude data with certain radio measurements, so as to generate or update a radio map to accurately represent characteristics of radio signals expected to be observable respectively at different attitudes/floors of an indoor area, which in turn could enable accurate positioning estimations, e.g., in a multi-level building.

Furthermore, because the above-described collection of fingerprint(s) is beneficial, such collection of fingerprint(s) could be part of a crowdsourcing process that occurs continuously or at least from time-to-time. For example, mobile devices of a large number of consumers could continuously transmit fingerprint(s) to the positioning server (e.g., server system 102) collecting the fingerprint(s). Consumers may consent to participation in such a collection process, if their device is equipped with necessary functionality to enable the fingerprint generation and/or collection at issue as a background process, naturally with the end-user consent. Also, it could be possible to use volunteers to actively survey area(s) so as to enable collection of fingerprint(s) for those area(s). Other examples are also possible.

Given that collection of fingerprint(s) may allow for understanding of how radio signals behave and travel in an area (e.g., a building), the server system 102 could use the collected fingerprint(s) in various ways to generate or update a radio map for the area.

By way of example, the server system 102 could define a grid having a plurality of points at e.g., intersecting lines. The server system 102 may define the grid to cover a site such that each grid point corresponds to a geographical location at the site. If the site (e.g., a building) comprises several floors, a separate grid may be defined for each floor, or a single three-dimensional grid may be defined with one dimension for the different floors.

Given this, if the server system 102 collects a fingerprint from a mobile device (e.g., a report that includes RSS value(s), associated radio device identifier(s), and/or other information as discussed), the server system 102 could map (i) RSS value(s) and/or associated radio device identifier(s) included in that fingerprint to (ii) the grid point corresponding to a geographical location that is closest to the position estimate indicated in that fingerprint. The server system 102 could perform such a process respectively for some or all fingerprint(s) collected from mobile device(s) in the site, so as to generate a grid-based radio map for the site.

In this example, if there are several RSS values for the same radio device that would be mapped to the same grid point, the server system 102 could determine an average value (e.g., arithmetic mean or median value) of those RSS values and associate the average value with the grid point at issue. On the other hand, for grid points to which no RSS values could be mapped due to missing fingerprint(s) from the corresponding areas at the site, the server system 102 could generate RSS values by interpolating surrounding RSS values if possible, and by extrapolating neighboring RSS values otherwise. In this way, the server system 102 could generate the radio map to identify radio devices and/or RSS values expected to be observed respectively at each of a plurality of locations throughout the site. Other (e.g., non-grid based) radio maps are also possible.

In some implementations, the radio map could include, be combined with, or otherwise correspond to another map or layout image representing features of an indoor and/or outdoor area at various locations in the area (e.g., an open area map for a pedestrian walkable area as further described herein). In the context of an indoor area, for instance, such features may include rooms, hallways, entryways (e.g., doors), vertical connectors (e.g., elevators, escalators, and/or stairs), and/or items situated in the indoor area (e.g., furniture), among numerous other possibilities. Given this, the radio map could indicate characteristics of the radio environment respectively at or nearby certain features in the area. Moreover, a mobile device could be configured to display such a radio map, to enable automatic or manual assessment of the radio environment in the area. Such an assessment could help determine whether sufficient extent of fingerprint(s) has been collected in a certain location (e.g., near a certain feature), and may provide other advantages as well.

Once a radio map is generated or updated, the server system 102 could store the radio map in a database 108, so that the server system 102 could refer the radio map or a portion thereof on an as-needed basis and/or so that the server system 102 provide the radio map or portion thereof (e.g., to a mobile device) on an as-needed basis for positioning purposes. Generally, the stored radio map could be associated with an indoor or other space (e.g., a particular building) for which the radio map provides coverage. And the server system 102 and/or a mobile device could select a radio map to be used for positioning purposes that is associated with an indoor (or other) space at which or next to which the mobile device is located. In practice, the server system 102 and/or a mobile device could determine an indoor space at which or next to which the mobile device is located based on GNSS measurement(s) by the mobile device and/or an identifier of an access point to which the mobile device is connected, among other options.

In one case, the server system 102 could use the radio map to estimate a position of a mobile device, such as in response to a request by the mobile device to do so. In particular, the server system 102 could receive, from the mobile device, a measurement report indicating identifiers of radio device(s) and/or RSS values that are observable by the mobile device at the current position of the mobile device, and possibly other radio characteristics observable by the mobile device. In some scenarios, the measurement report could optionally also include other information that might aid in determining a position estimate, such as e.g., barometric/altitude information that may assist in determining a floor level as part of the position estimate. Nevertheless, the server system 102 can compare information in the measurement report to the radio map, to determine a position estimate. For example, the server system 102 could determine that radio device identifier(s) and RSS value(s) in the measurement report substantially match radio device identifier(s) and RSS value(s) associated with a particular grid point corresponding to a particular geographical location at the site. In turn, the server system 102 could provide, to the mobile device, a position estimate indicative of the particular geographical location at the site.

In another case, the mobile device could use the radio map (or a portion thereof) to estimate its position. To facilitate this, the mobile device could obtain, from the server system 102, at least a portion of the radio map, and could at least temporarily store the radio map locally. Once the mobile device has the radio map locally stored thereon, the mobile device could use the techniques described above in association with the server system 102 so as to estimate its position (e.g., comparing information in a measurement report to the radio map). In this way, the mobile device could engage in "offline" positioning estimations.

Advantageously, the mobile device could engage in "offline" positioning estimations at times when connectivity between the mobile device and the server system 102 is unavailable, when it is desired to reduce a load on the server system 102 (e.g., reduce the extent of processing by the server system 102), when the mobile device seeks to obtain a position estimate relatively quickly (e.g., a very short time-to-first-fix), or in other situations.

In any case, a position estimate obtained using the above-described positioning solution could be used in various ways. For example, the mobile device could display (e.g., via a display device) an indoor navigation application including, e.g., an open area map of an indoor area and visually indicating a position of the mobile device in the indoor area in accordance with the position estimate obtained as described. Other examples are also possible.

Figure 2A:
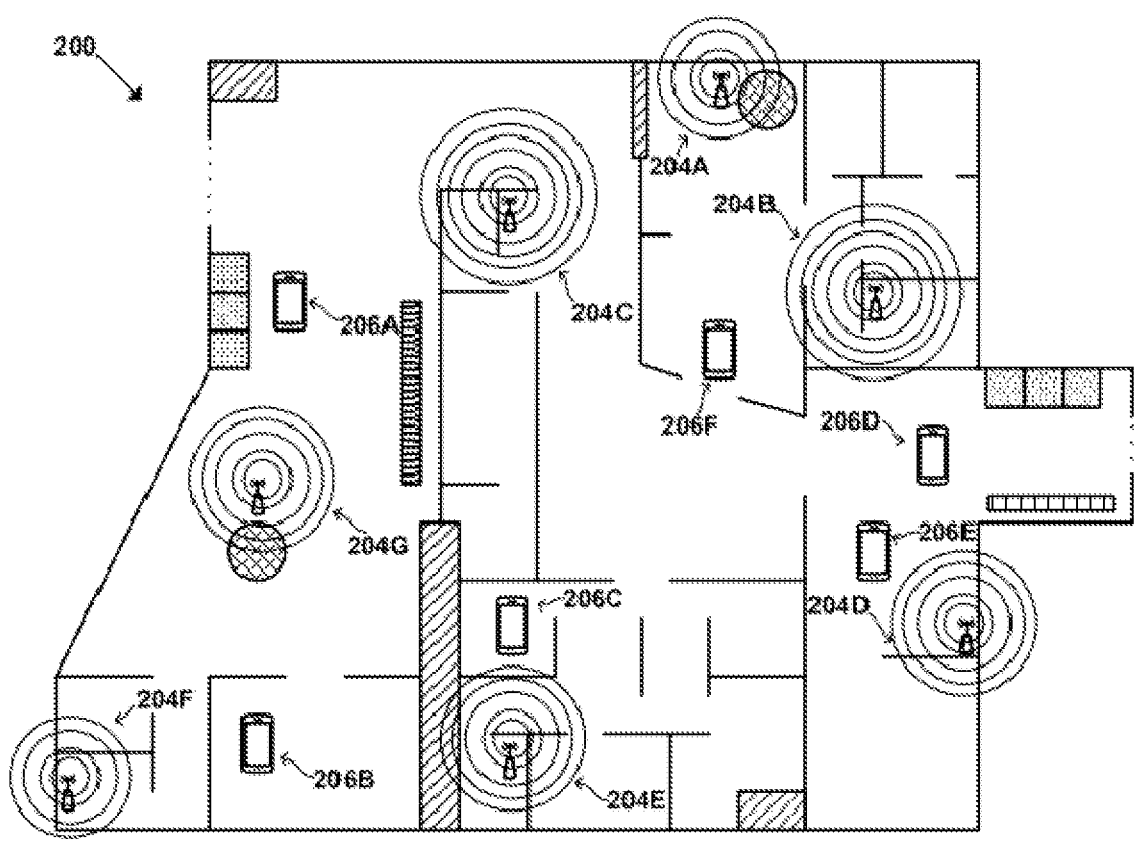
FIGS. 2A and 2B illustrate an indoor area at which radio device(s) and mobile device(s) can be located, in accordance with an example implementation.
Figure 2B:
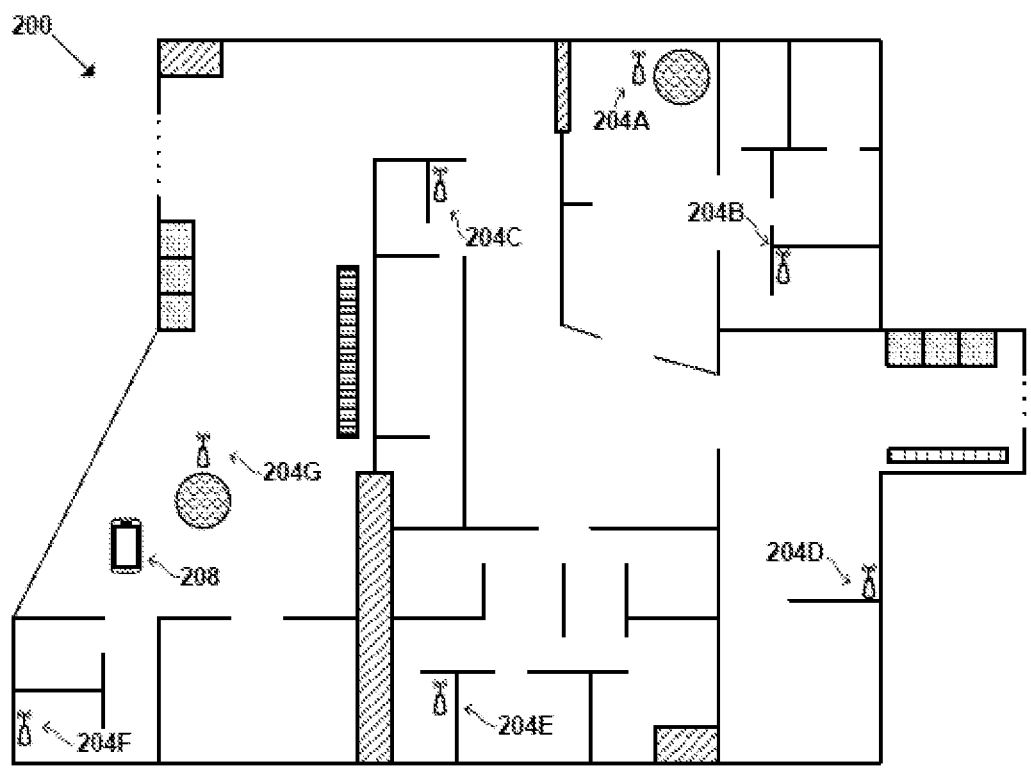
Figure 2C:
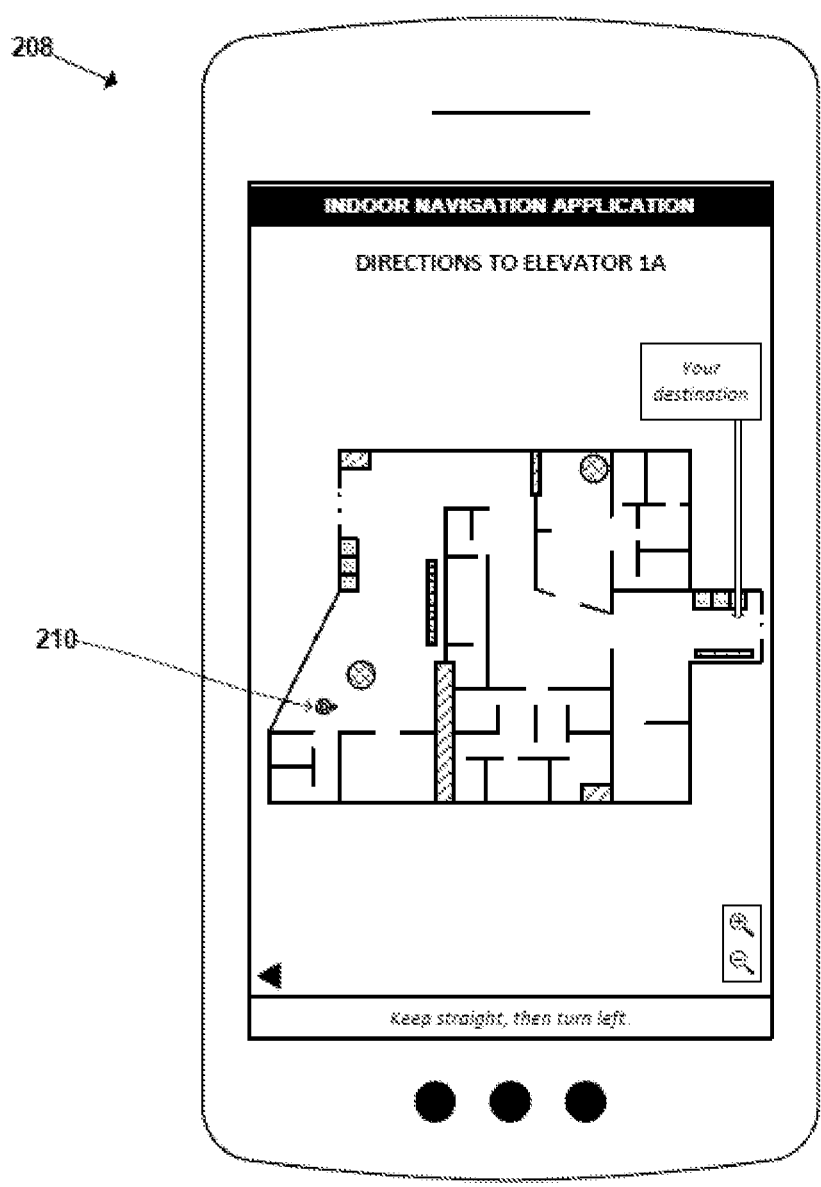
FIG. 2C illustrates an example indoor navigation application, in accordance with an example implementation.

FIGS. 2A to 2C next illustrate an example implementation and use of the above-described positioning solution. Although FIG. 2A to 2C illustrate an implementation in the context of an indoor scenario, it should be understood that the same or similar positioning solution could extend to apply in the context of various outdoor scenarios and implementations.

FIG. 2A illustrates an indoor area 200 taking the form of a floor in a building. As shown, several radio devices 204A-204G are positioned throughout the indoor area 200 and several mobile devices 206A-206F are positioned in and/or moving throughout the indoor area 200. Each of the radio devices 204A-204G emits radio signal(s). Of course, it should be understood that such radio signals are shown for illustration purposes only, and that the illustrated signals do not necessarily indicate coverage, strength, and/or other radio characteristics of those signals. In any case, the mobile devices 206A-206F may each respectively measure the radio signals at issue and then transmit, to a positioning server (e.g., server system 102), fingerprint(s) indicating position estimate(s) and the corresponding radio measurement(s). In turn, the positioning server may generate or update a radio map for indoor area 200 as described.

FIG. 2B illustrates a mobile device 208 that is positioned in and/or moving through the indoor area 200. The mobile device 208 could be one of the mobile devices 206A-206F that provided fingerprint(s) as described or could be a different mobile device. In either case, the mobile device 208 could observe characteristics of the radio environment at its current position by measuring radio signals emitted by one or more of the radio devices 204A-204G. The mobile device 208 could then refer to the radio map that was generated or updated as described in associated with FIG. 2A and could determine a position estimate based on the radio characteristics and the radio map as described. Alternatively, the mobile device 208 could transmit, to the positioning server, a request for a position estimate (e.g., a measurement report), which may indicate the observed radio characteristics at issue. In turn, the position server could determine a position estimate based on the radio characteristics and the radio map as described and could then provide the position estimate to the mobile device 208 in response to the request.

FIG. 2C then illustrates how the mobile device 208 could use the position estimate that was determined using the above-described solution. As shown, the mobile device 208 could display an indoor navigation application that includes an open area map of the indoor area 200 as well as a visual indicator 210 of the mobile device 208's position in accordance with the position estimate at issue. Accordingly, the navigation application could use position estimates obtained as described in order to accurately display the current position of the mobile device 208 and/or to help a user of the mobile device 208 accurately navigate through the indoor area 200, among numerous other possibilities. Other illustrations are also possible. FIG. 2C also demonstrates how a graphical user interface may be used to control and interact with the apparatus in some embodiments.

The examples above are one manner by which indoor positioning might occur and are in no way limiting. Various other systems and methods for indoor, semi-indoor, and outdoor positioning might also be utilized by various embodiments of the presently disclosed apparatus, methods, etc.

Radio map quality data may also be determined and utilized by the presently disclosed system. Examples of such data being utilized may be found in U.S. Pat. No. 10,175,336 incorporated herein by reference.

II. Example Hardware and Software

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 3:
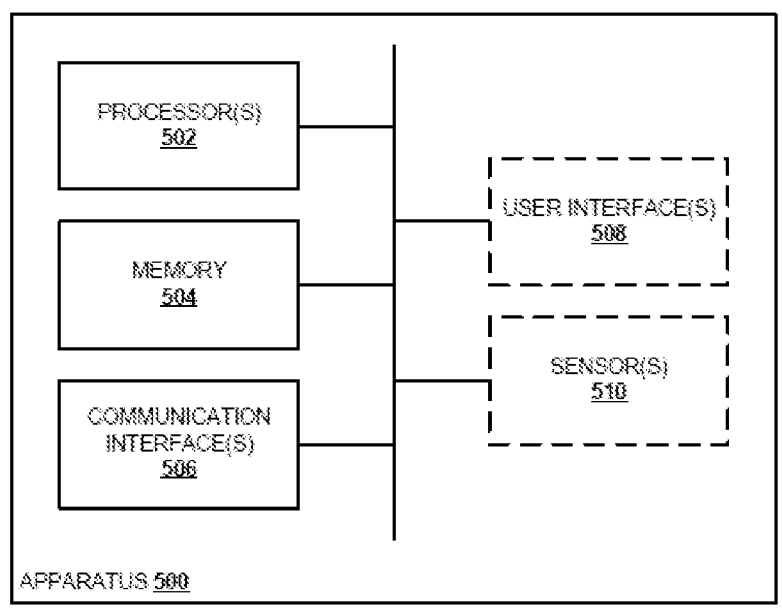
FIG. 3 is a schematic block diagram of an apparatus that may be involved in a feedback loop for improving a positioning system.

FIG. 3 is a schematic block diagram of an apparatus 500 that may be involved in a feedback loop for improving performance of a radio-based positioning system, according to an example embodiment. The apparatus 500 could, for instance, represent a server (e.g., server system 102) or a mobile device (e.g., one of the mobile devices 106), among other options. Moreover, the apparatus 500 could take the form of or otherwise be part of a system, such as any of those described herein.

As shown, apparatus 500 could include processor(s) 502, a memory 504 (e.g., database 108), communication interface(s) 506, an (optional) user interface(s) 508, and (optional) sensor(s) 510. Some or all of the components of the apparatus 500 may be connected via a bus (or other mechanism) and/or be combined into one or more modules.

Processor(s) 502 could have numerous functions, such as controlling the memory 504, communication interface(s) 506, the user interface(s) 508, and/or the sensor(s) 510 in any feasible manner currently known or developed in the future. For example, the memory 504 could include or otherwise contain computer program code (program instructions), and the processor(s) 502 may be configured to execute the program code to cause the apparatus 500 to perform and/or control operations, such as any of those described herein and/or other operations. Thus, apparatus 500 and/or processor(s) 502 could be referred to as carrying out such operations.

Moreover, processor(s) 502 (and also any other processor(s) mentioned herein) may be processor(s) of any suitable type. For example (and without limitation), processor(s) 502 may include: one or more microprocessor(s), one or more processor(s) with accompanying one or more digital signal processor(s), one or more processor(s) without accompanying digital signal processor(s), one or more special-purpose computer chips, one or more FPGA(s), one or more controller(s), one or more ASIC(s), one or more computer(s), any structure/hardware that has been programmed in such a way to perform described operation(s), and/or an application processor that runs an operating system, among other possibilities.

Furthermore, memory 504 could also take various form without departing from the scope of the present disclosure. In particular, memory 504 could be separate from processor(s) 502. Additionally or alternatively, memory 504 may be part of or otherwise integrated with one or more of the processor(s) 502. In this case, memory 504 may be fixed to the from processor(s) 502 or may be at least partially removable from the processor(s) 502. In any case, the memory 504 be or take the form of volatile and/or non-volatile memory, and could include program memory, working memory, and/or data memory, among others.

By way of example (and without limitation), memory 504 could be or otherwise include: FLASH memory (or a part thereof), any of a Read-Only Memory (ROM), PROM, EPROM and EEPROM memory (or a part thereof), a hard disc (or a part thereof), a Random Access Memory (RAM), and/or Dynamic RAM (DRAM), among others. In some cases, memory 504 may additionally or alternatively include an operating system for processor(s) 502 and/or firmware for apparatus 500. Further, memory 504 could additionally or alternatively be used by processor(s) 502 when executing an operating system and/or computer program. Moreover, memory 504 could additionally or alternatively store data, such as any types, sets, instances, and/or samples of data described herein. Other examples are also possible.

Further, communication interface(s) 506 could enable the apparatus 500 to communicate with other entities. The communication interface(s) 506 may, for instance, include a wireless interface (e.g. a cellular radio communication interface and/or a WLAN interface) and/or wire-bound interface (e.g. an IP-based interface, for instance to communicate with entities via the Internet). Moreover, the communication interface(s) 506 may take the form of or provide for wireless and/or wired communication with transmitting and/or receiving device(s), such as one or more antenna(s) and/or radio receiver(s) of the apparatus 500.

Yet further, user interface(s) 508 could be any device(s) for presenting and/or receiving information. For instance, user interface(s) 508 include display device(s), audio device(s) or the like for visually and/or audibly providing information (e.g., to a user). Additionally or alternatively, user interface(s) 508 could include input device(s) (e.g. a keyboard, keypad, touchpad, mouse, etc.) for receiving information (e.g., based on input provided by a user).

Finally, sensor(s) 510 could include any type(s) of sensor(s) currently known and/or developed in the future. For example, sensor(s) 510 could include a barometric sensor (e.g., to gather pressure information), motion sensor(s) (e.g., inertial measurement unit (IMU)), image capture device(s), position sensor(s), Global Navigation Satellite System (GNSS) receiver(s) (e.g., in the form of a Global Positioning System (GPS) receiver), and/or any (currently known and/or future-developed) sensor(s) that enable the apparatus 500 to perform radio measurements (e.g., Bluetooth and/or Wi-Fi receiver(s)), among other possibilities.

In a further aspect, the term "computer-readable medium" as used herein may refer to any medium that participates in providing information to processor(s), including instructions for execution. Such a medium may take many forms, including, but not limited to computer-readable storage medium (e.g., non-volatile media, volatile media), and/or transmission media. Non-transitory media, such as non-volatile media, may include, for example, optical or magnetic disks, such as storage device. Volatile media may include, for example, a dynamic memory. Transmission media may include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Generally speaking, common forms of computer-readable media may include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read.

In some cases, the term computer-readable storage medium may be used herein to refer to any computer-readable medium except transmission media. Further, logic encoded in one or more tangible media may includes processor instructions on a computer-readable storage media and/or special purpose hardware (e.g., ASIC).

In practice, a computer-readable storage medium could have stored thereon instructions executable by processor(s) to cause an apparatus to perform operations, such as any of those described herein. Accordingly, a computer program could be stored in a computer readable storage medium in the form of instructions encoding the computer readable storage medium. The computer-readable storage medium may be intended for taking part in the operation of a device, like an internal or external memory or hard disk of a computer, or be intended for distribution of the program, like an optical disc, among other options.

The device, system, apparatus, methods, etc. may also include one or more light sources and one or more light receivers. In one embodiment, a Light Detection and Ranging ("LIDAR") device or sensor, a laser device, and/or other device that collects data points, such as three-dimensional data, by transmitting and receiving light may be utilized. For example, a LIDAR device that uses one or more lasers to collect data points representing a surrounding area, such as an area about a road or path or other area. The LIDAR device collects and gathers data points in a point cloud, such as a three dimensional ("3D") point cloud, in which each data point corresponds to a local coordinate, such as (x, y, z). The one or more lasers may be in a near infrared spectrum (such as about 700 nm to about 5000 nm or about 800 nm to about 2500 nm) or another light spectrum.

The LIDAR devices/sensors may feature one or more buttons, keypad, keyboard, mouse, stylist pen, trackball, rocker switch, touch pad, voice recognition circuit, or other device or component for controlling or inputting data in one or more of the components of the device.

The data collected by the LIDAR device(s) may be stored on one or more computer-readable media, such as a CD-ROM, DVD, flash drive, hard drive, or other non-transitory tangible media suitable to store data. Alternatively, the media may be signals carrying or having data. Separate media may be used to store separate or different types of data. In one embodiment, photographic images (such as digital or electronic photographs), video images, LIDAR data or laser data, location data, and/or other geographic data collected by the LIDAR device is stored in one or more media. The collected image/video data may represent areas or regions about or around a path, road, or other area. For example, the collected image or video data may include geographic features, such as sky features, terrain or surrounding features, roads or paths (such as sidewalks), road or path markings (such as cross-walks or lane markings), road or path signs, points-of-interest ("POIs") such as buildings, parks, museums, indoor mapping data, etc., and/or other man-made and/or natural features or objects.

The collected image or video data and/or other collected data are sent, such as via one or more media, to the geographic database (see below). Some or all of the collected data may be transmitted to the geographic database developer via a wireless and/or wired network. For example, the network may include the Internet, an intranet, a local area network ("LAN"), a wide area network ("WAN"), a virtual private network ("VPN"), a server network, a cellular network, a satellite network, a broadcasting network, a wireless or wired connection, and/or any known or future network or connection.

III. Example Geographic Database

Figure 4:
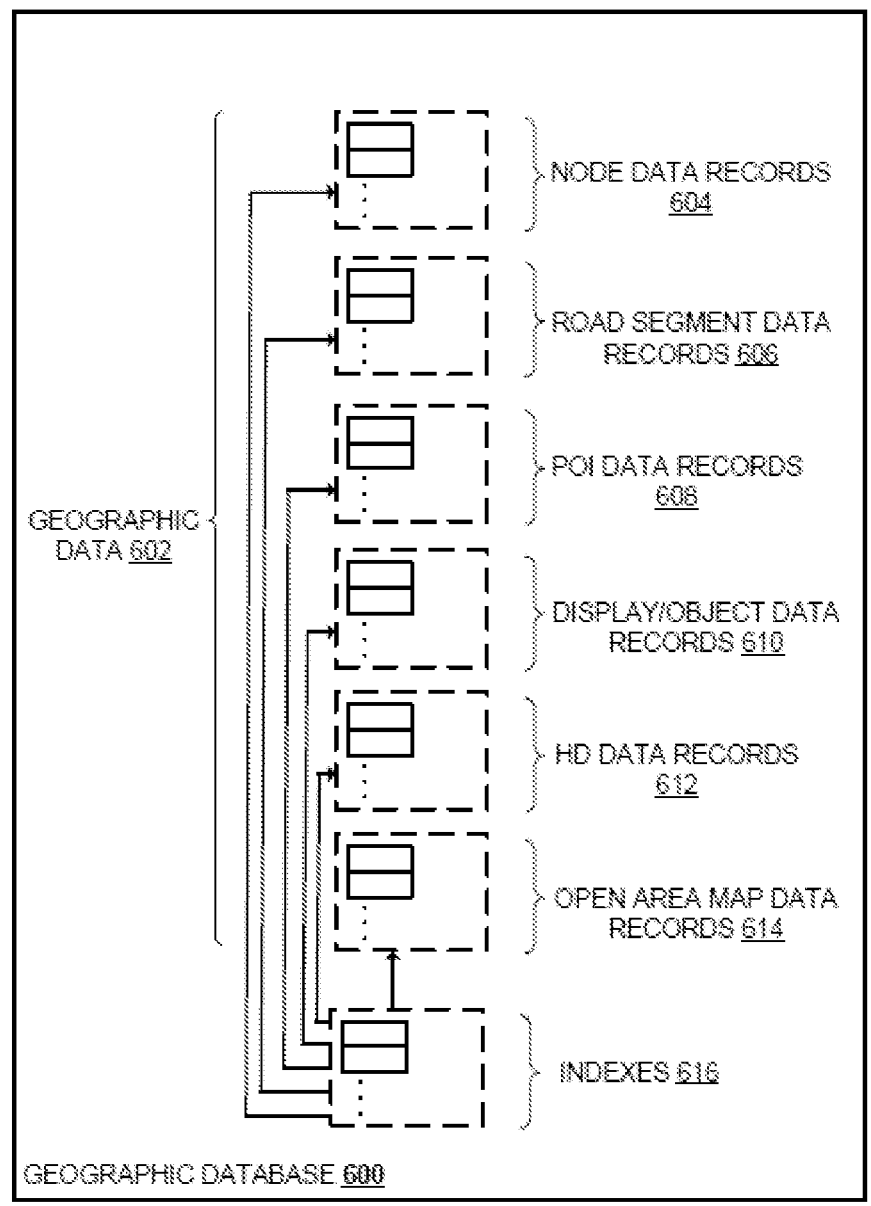
FIG. 4 illustrates a diagram of a geographic database, according to an example implementation.

FIG. 4 illustrates a diagram of a geographic database 600, according to an example implementation. Geographic database 600 could be included within, integrated with, or be separate from another database, data storage device, memory, or the like described herein (e.g., memory 504). Additionally, or alternatively, geographic database 600 could be stored on or otherwise made accessible to any entity described herein without departing from the scope of the present disclosure. Moreover, although certain aspects of the geographic database are described in the context of outdoor mapping and/or outdoor navigation-related services, it should be understood that some or all such aspects could extend to apply in the context of indoor mapping and/or indoor navigation-related services.

In this regard, the terms indoors, indoor area, indoor space, indoor environment, or the like used herein could refer any physical area/space that is at least partially enclosed, such as, e.g., for purpose of at least partially covering people and/or object(s) (e.g., a building, home, venue, tunnel, etc.) And the terms outdoors, outdoor area, outdoor space, outdoor environment, or the like used herein could refer to any physical areas/spaces other than those that are indoors (e.g., a park, street, intersection, sidewalk, beach, plaza, etc.) Of course, the terms indoors and outdoors or the like can be defined in other ways as well.

More specifically, the geographic database 600 may include geographic data 602 used for (or configured to be compiled to be used for) mapping and/or navigation-related services. For instance, the geographic database 600 may include high resolution or high definition (HD) mapping data that provide centimeter-level or better accuracy of map features. By way of example, the geographic database 600 can be based at least in part on Light Detection and Ranging (LiDAR) and/or other technology to collect billions of 3D points and model road surfaces (and/or other map features down),e.g., to the number lanes and their widths. In some cases, the HD mapping data (e.g., HD data records 612) may capture and store details such as the slope and curvature of the road, lane markings, roadside objects such as sign posts, including what the signage denotes, and/or shape/sizes of indoor objects, hallways, rooms etc. In practice, the HD mapping data may enable precise localization of an entity on a road and/or in a building, and/or may enable determination of map data updates (e.g., learned speed limit values) to at high accuracy levels, among other options.

In the geographic database 600, geographic features (e.g., two-dimensional or three-dimensional features) may be represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In this regard, the following terminology may apply to the representation of geographic features in the geographic database 600.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In an example implementation, the geographic database 600 may follow certain conventions. For example, links might not cross themselves and might not cross each other except at a node. Also, there may be no duplicated shape points, nodes, or links. Two links that connect each other may have a common node. In the geographic database 600, overlapping geographic features may be represented by overlapping polygons. When polygons overlap, the boundary of one polygon may cross the boundary of the other polygon. In the geographic database 600, the location at which the boundary of one polygon intersects the boundary of another polygon may be represented by a node. In an embodiment, a node may be used to represent other locations along the boundary of a polygon than a location at which the boundary of the polygon intersects the boundary of another polygon. Additionally or alternatively, a shape point may not be used to represent a point at which the boundary of a polygon intersects the boundary of another polygon.

In an example implementation, the geographic database 600 may be stored as a hierarchical or multi-level tile-based projection or structure. More specifically, in one embodiment, the geographic database 600 may be defined according to a normalized Mercator projection. Other projections may be used. By way of example, the map tile grid of a Mercator or similar projection may be a multilevel grid. Each cell or tile in a level of the map tile grid may be divisible into the same number of tiles of that same level of grid. In other words, the initial level of the map tile grid (e.g., a level at the lowest zoom level) may be divisible into four cells or rectangles. Each of those cells are in turn divisible into four cells, and so on until the highest zoom or resolution level of the projection is reached.

In some implementations, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. Further, each cell may be divided into four rectangles and numbered by concatenating the parent tile ID and the new tile position. A variety of numbering schemes also is possible. Any number of levels with increasingly smaller geographic areas may represent the map tile grid. Any level (n) of the map tile grid may have 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In this regard, a system may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In an embodiment, the quadkey is an example of the hash or encoding scheme of the respective geographical coordinates of a geographical data point that can be used to identify a tile in which the geographical data point is located.

As shown, the geographic database 600 may include node data records 604, road segment, drivable area, or link data records 606, Points of Interest (POI) data records 608, display/object data records 610, HD mapping data records 612, open area map data records 614, and indexes 616, for example. More, fewer or different data records can be provided. For example, other data records can include cartographic data records, routing data, and/or maneuver data. Further, the indexes 616 may improve the speed of data retrieval operations in the geographic database 600. For instance, the indexes 616 may be used to quickly locate data without having to search every row in the geographic database 600 every time it is accessed. For example, in one embodiment, the indexes 616 can be a spatial index of the polygon points associated with stored feature polygons.

In exemplary embodiments, the road segment data records 606 may be links or segments representing roads, streets, paths, or another drivable area (e.g., parking lots and structures) as can be used in a calculated or recorded route information for determination of one or more personalized routes. The node data records 604 may be end points corresponding to the respective links or segments of the road segment data records 606. The road segment data records 606 and the node data records 604 may represent a road network, such as used by vehicles, cars, and/or other entities. Alternatively, the geographic database 600 can contain path segment(s) and node data records or other data that represent pedestrian paths or areas in addition to or instead of the vehicle road record data (e.g., paths and/or areas for indoor and/or outdoor positioning and/or navigation), for example.

The road/link segments and nodes can be associated with attributes, such as geographic coordinates, street names, address ranges, speed limits, turn restrictions at intersections, and other navigation related road attributes, room names/identifiers, vertical connector names/identifiers, as well as POIs, such as gasoline stations, hotels, restaurants, museums, stadiums, offices, automobile dealerships, auto repair shops, buildings, stores, parks, interior building features etc. The geographic database 600 can include data about the POIs and their respective locations in the POI data records 608. The geographic database 600 can also include data about places, such as cities, towns, or other communities, and other geographic features, such as bodies of water, mountain ranges, etc. Such place or feature data can be part of the POI data records 608 or can be associated with POIs or POI data records 608 (such as a data point used for displaying or representing a position of a city). Other examples are also possible.

In some implementations, the geographic database 600 can include display/object data records 610 for storing machine-readable visual representations and map data decoded from the visual representations and their respective properties. In addition, the display/object data records 610 can store post-processing rule sets for correcting and/or reducing the uncertainties in the display/object data decoded from clustered machine-readable visual representations. The display/object data records 600 can also store data selection rules (e.g., in a map data extension layer) for selecting from among multiple sets of readings of a machine-readable visual representation. The display/object data records 600 can also store confidence or accuracy determinations for the decoded map data. By way of example, the display/object data records 600 can be associated with one or more of the node records 604, road segment records 606, and/or POI data records 608 to support uses cases such as enhanced mapping user interfaces (UIs), autonomous driving, dynamic map updates, etc. In some cases, the display/object data records 610 may be stored as a data layer of the hierarchical tile-based structure of the geographic database 600 according to the various embodiments described herein.

In some implementations, as discussed above, the HD mapping data records 612 could model map features to centimeter-level or better accuracy. The HD mapping data records 911 may be divided into spatial partitions of varying sizes to provide HD mapping data to vehicles and/or other devices with near real-time speed without overloading the available resources of the vehicles and/or devices (e.g., computational, memory, bandwidth, etc. resources).

In an example implementation, the geographic database 600 can be maintained by a content provider in association with a services platform (e.g., a map developer). The map developer can collect geographic data to generate and/or enhance the geographic database 600. There can be different ways used by the map developer to collect data. These ways can include obtaining data from other sources, such as municipalities or respective geographic authorities. Additionally or alternatively, the map developer can employ field personnel to travel along roads and/or inside buildings (or other indoor areas) throughout the geographic region to observe features and/or record information about them, for example. Additionally or alternatively, remote sensing, such as aerial or satellite photography, can be used.

Generally, the geographic database 600 can be a master geographic database stored in a format that facilitates updating, maintenance, and/or development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data can be compiled (such as into a platform specification format (PSF)) to organize and/or configure the data for performing navigation-related functions and/or services, such as route calculation, route guidance, map display, speed calculation, distance and travel time functions, and other functions, by a navigation or other device. The navigation-related functions can correspond to vehicle navigation, pedestrian navigation, or other types of navigation. The compilation to produce end user databases can be performed by a party or entity separate from the map developer. For instance, a customer of the map developer, such as a navigation device or other end user device developer, can perform compilation on a received geographic database in a delivery format to produce one or more compiled navigation databases.

In a further aspect, as noted, the geographic database 600 could additionally or alternatively include open area map data record(s) 614 for open area map(s). Generally speaking, open area map(s) may include image(s) or the like of respective layout(s) representing pedestrian walkable area(s) (e.g., indoor area(s), such as one or more floors of a building and/or garage), and may be configured, separately or together, to enable or otherwise provide point-to-point routing within the layout(s). For example, in line with the discussion above, a radio map could include, be combined with, or otherwise correspond to an open area map representing features of an indoor and/or outdoor area at various locations in the area, to enable positioning and/or navigation solution(s) for the area. Other examples are also possible.

In an example implementation, an open area map may be positioned in, on, or over a geographic map or database (e.g., geographic database 600). The geographic map may be or include geographic data (e.g., any feasible data from records 604-612) corresponding to an area other than (or perhaps at least partially overlapping with) the area represented in the open area map. Also, the geographic map may represent compiled data that corresponds to a database or map configured for vehicle and/or pedestrian navigation. Alternatively, the geographic map may correspond to any real-world or geographic map or data that may or may not be used for navigation or routing. In any case, the geographic map may, e.g., include, but is not limited to, a road network. The road network may represent real-world roads or paths, such as in a city or other geographic region. Navigation attributes and POIs may also be provided.

In this regard, the open area map may be associated or linked with the geographic map or data. For example, one or more points or coordinates of the open area map may be aligned or positioned in or with one or more points or coordinates of the geographic map or data. In one embodiment, coordinates corresponding to tiles, objects, or other portion of the open area map may be in, translated to, or converted to real-world coordinates, such as longitude or latitude, Universal Transverse Mercator ("UTM") coordinates, or other rectangular or 3D coordinates, such as altitude or elevation points. Based on the real-world coordinates, the open area map or data thereof may be placed, positioned, or aligned with or within the geographic map.

For example, nodes, segments, or other features of the geographic map may correspond to real-world coordinates, such as longitude, latitude, and/or UTM coordinates as well as elevation or altitude information. Accordingly, by knowing the real-world coordinates of the open area map, the open area map may be accurately linked to a real-world position or location in the geographic map (e.g., geographic database 600 and/or a display). Additionally or alternatively, the coordinates or points of the open area map or data thereof may be linked or associated with a road network, such as road segments, nodes, and/or other features, without reference to real-world coordinates.

Given this, an end user may perform point-to-point routing using the open area map while viewing a surrounding geographic area or map. Also, the open area map may be linked to the geographic map for navigation or routing purposes, such as via point or navigation data.

For example, an end user may want to navigate or route from inside the open area map to a point external to the open area map that is covered in the geographic map, or vice versa (e.g., an indoor-to-outdoor transition and/or an outdoor-to-indoor transition). Accordingly, a route may be calculated and/or displayed in the open area map (e.g., in the context of indoor navigation), and then from a transition point or area, the route or second route (a continuing route to a selected destination outside of the open area map) may be calculated and/or displayed based on route calculation of the geographic map.

In this regard, in some cases, the navigation or routing of the geographic map may be different than the point-to-point routing of the open area map. For example, the routing of the geographic map may be based on vehicle and/or pedestrian navigation attributes of set roadways/drivable areas, and the routing of the open area map may be based on pedestrian navigation attributes of set indoor features (e.g., hallways, lobbies, rooms etc.) But in other cases, the navigation or routing of the geographic map could be the same as or similar to the point-to-point routing of the open area map.

In any case, in other implementations, an open area map may be positioned in or associated with the geographic map without being linked or tied in with navigation or routing features or functions of the geographic map. Namely, the routing or navigation of at least some open area map(s) may be independent or separate from routing or navigation of an associated geographic map. Other examples and aspects are also possible.

IV. Example Method(s) for Positioning

As noted above, the present disclosure is directed to an improved approach for positioning based on non-unique information obtained from network devices.

Figure 5:
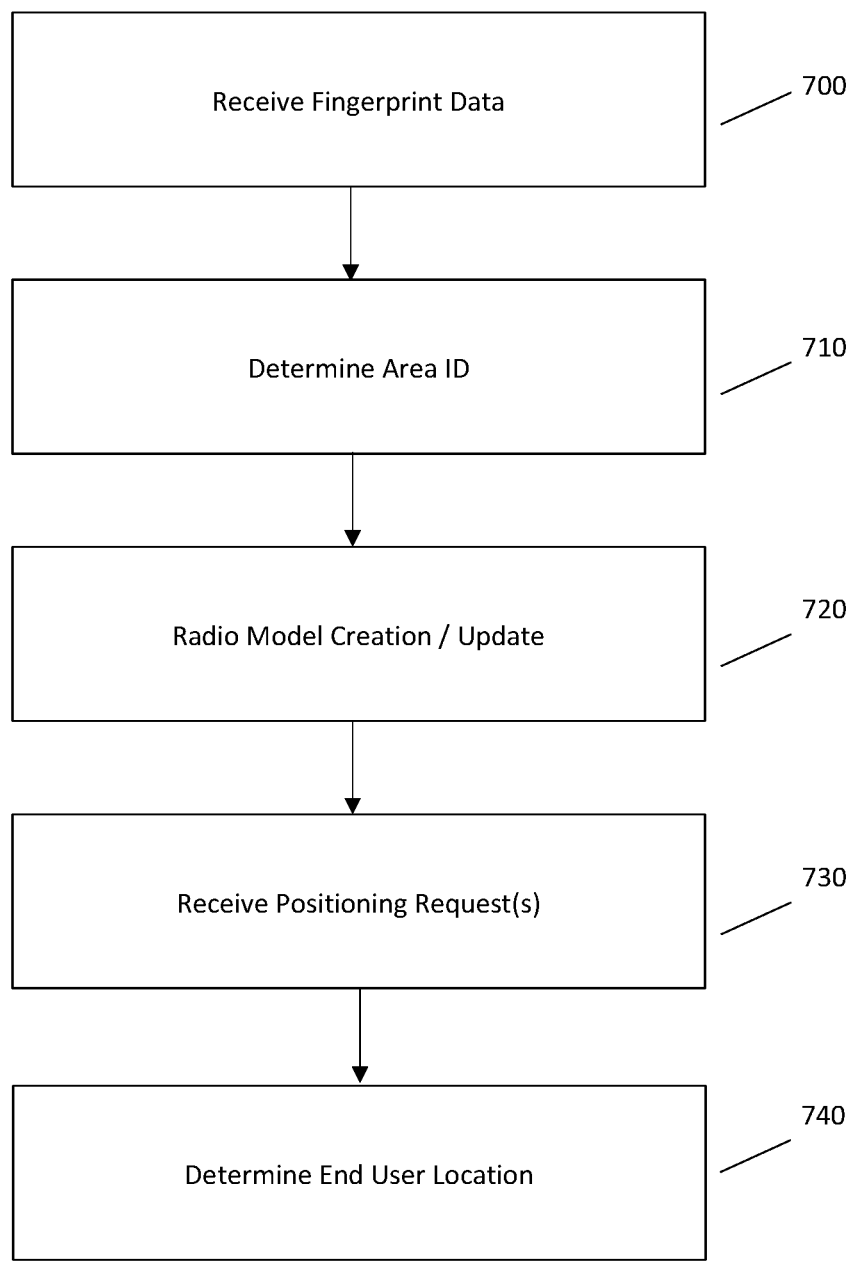
FIG. 5 is a flowchart illustrating one embodiment of the apparatus.

FIG. 5 is a flowchart illustrating one embodiment of how the presently disclosed system, apparatus, methods, etc. may create and/or update radio maps and then use this updated information for positioning. In one embodiment, there may be one or more servers that maintain radio maps. Within the radio map, there may be radio model(s) for each network name and physical location (this combination being associated with an area id in some examples). The radio model(s) may be coverage area models, a set of estimated transmitter locations, or a set of received signal strength (RSS) values as a function of position, etc. There may also be multiple estimated locations and received signal strength (RSS) values stored by one or more server(s) as part of a given radio map. This is because a single radio model may correspond to multiple physical transmitters/communication nodes in some embodiments.

As shown in FIG. 5, at a first step (box 700), the one or more servers may receive a fingerprint that contains a pre-established reference location, a multiset of observed network names (e.g., Wi-Fi SSID or BLE URL) and optionally other measurements such as received signal strength or round-trip time for each network (possibly multiple measurements per network name). At a second step (box 710) the server(s) may then determine an area identifier (area ID) for the fingerprint based on existing reference locations. For each network name in the fingerprint, the server may also check if a given radio map contains a radio model for the combination (e.g., a combination of network name, area id, reference location(s), etc.). The area ID is useful to serve as an identifier in one or more databases for quick retrieval of the associated radio model data.

In some embodiments, the area identifier may be used in tandem with or replaced by other means by which to identify the fingerprint and reference location combination. For example, the apparatus may quantize the reference position(s) with a certain resolution (e.g., 0.01 degrees in latitude and longitude) and store the quantized coordinates as the radio model identifier. When used in this manner, a new fingerprint to be associated with a given model will be assigned the same (quantized) coordinates that the radio model has, thus making it efficient to find the correct model stored within a database. This may also be seen as using the quantized coordinates as a form of area identifier (instead of a unique/arbitrary standalone identifier database entry).

In other embodiments, the apparatus may identify a radio model with arbitrary location coordinates (e.g., estimated communication node location) and store this coordinate information into a database. When a new fingerprint is received, the apparatus may find the radio model that has the same network name (matching the name contained in the fingerprint) and a location based on coordinate information which is closest to the fingerprint's location (out of all stored models with the same network name). A proximity threshold might also be applied (e.g., stored models associated with a network name that are closer than 1 kilometer from the fingerprint location) to improve efficiency and accuracy.

The server may then take several different actions including (box 720) initialize a new radio model with the measurement(s) received from the fingerprint(s) if there is no (or a poor) match to what is stored in the server databases.

Alternatively, the system, method, etc. may update one or more existing radio models with the newly acquired data from the fingerprint(s). For example, if there is only a partial match between the information stored in the database and that of a given fingerprint, the apparatus may select the closest match based on various data and metadata then update the closest matching record instead of creating a new one. If the stored data in one or more databases matches the new data from a fingerprint closely enough, no update may be needed.

In some embodiments, if the radio model has a strong enough RSS, the radio model may be selected based on the fingerprint information alone. For example, the system, method, etc. may select a radio model associated with a fingerprint for the closest known location (e.g., closer than 10 meters from a given node) or otherwise create a new estimate if there is no existing model which contains the required RSS strength.

Alternatively, or additionally, a radio model may aggregate, for example, maximum, minimum, average RSS and a count of signals received from the communication/radio nodes (transmitters) with a given network name and a given physical location. When enough data is aggregated to reach a predefined threshold, locations of multiple transmitters with the same network can be estimated by clustering the maximum RSS nodes.

An example embodiment may be utilized to map the floor of an office building; within which there are multiple wireless transmitters all of which are named with the same SSID (e.g., HERE Technologies Floor 3 Guest Wi-Fi). Each of the wireless transmitters (e.g., routers, switches, extenders, amplifiers, etc.) has its own unique device ID and various data which may be tied to that unique ID. When this unique ID changes, is unavailable, or otherwise cannot be utilized—the present system, apparatus, method, etc. can still generate and/or estimate location data amongst other feedback for a given end user. To accomplish this, in some embodiments, the server(s) may store reference locations in the form of a pre-defined grid or other functional means which enable indoor positioning. The pre-defined reference locations may then be used in combination with other data (e.g., signal strength, SSID names, etc.) to generate fingerprints (detailed above) which can then be used by the system, apparatus, etc. to determine positioning without the need for unique device information (only broadcasted SSID info, etc.).

The one or more servers may then (box 730) receive a positioning request that contains a multiset of network names and optionally other measurements such as RSS or round-trip time for each network in the multiset (possibly multiple per network name). Optionally, the end user (client) may also provide its latest known location and/or other data such as measurements of other communications networks (e.g., cellular networks), known area or building information, or the IP address.

The server(s) may then determine end user location (box 740) based on the most probable area id (the area id being associated with a physical location as discussed above) for the position request using one or more of the following methods. The server may fetch all radio models which correspond to the multiset of network names contained in the end user request and select the closest estimated area id based on the matching area ids of the fetched models. For example, the system, apparatus, etc. may select the area id associated with a radio model which itself contains information on the largest number of matching network names (matching to the multiset of names listed in the positioning request). This determination is then used to generate feedback in the form of location data for an end user, radio map updates, routing, etc. (see FIG. 2A-2C).

In the same or other embodiments, the system, apparatus, etc., by way of the one or more servers may also fetch a radio model associated with each network name in a positioning request and combine some or all the fetched radio models to generate a position estimate (e.g., compute intersection of coverage areas, or a maximum likelihood estimate based on a statistical signal propagation model).

The server may also use the latest known location of the end user (if fresh and precise enough) in some situations. The server may also use other prior information on location contained in the request (e.g., prior location(s) of the end user, cellular network measurements, area or building information, IP address) to improve functionality.

It should be noted FIG. 5 shows separate steps but any or all of the steps may be combined and executed in any order to complete the claimed systems, methods, etc. The positioning information as well as the radio maps, models, etc. may be used for route guidance, autonomous vehicle control, etc. The users defined herein may be active or passive human end users, AI, and other automated or manually controlled computerized systems, servers, etc. In some embodiments, the disclosed system, apparatus, method, etc. may be integrated with other systems to support higher level functions.

In other embodiments a positioning request may be sent by one or more users or devices that contains at least a multiset of communication node names. The names may be SSID names, Bluetooth node information, etc. For example, the SSIDs HERE FLOOR 3 West, HERE FLOOR 3 Southwest, and HERE FLOOR 3 South may be listed in a request as near an end user or otherwise noted in a request. The apparatus may then select a radio model, wherein the radio model selected is based at least in part on the number of communication node names proximate to a fingerprint which match the node names in the positioning request. The apparatus may store fingerprint data, including communication node names proximate to each fingerprint as well as an associate area ID. The apparatus may then examine the sets of SSID's associated with each fingerprint (and area ID) to find one that matches all, a majority, or at least some of the node names in a given positioning request. In this example, one stored fingerprint/area ID may be noted as being close to SSIDs HERE FLOOR 3 West and HERE FLOOR 3 Southwest thus enabling the apparatus to determine the positioning request (and thus the end user in this example) are located at or near the real world location associated with the selected area ID based on the matching SSIDs in the current request and stored data (from one or more fingerprints and other data sources).

It should be noted that the vehicles mentioned herein may represent any vehicle. Such vehicles may be standard gasoline powered vehicles, hybrid vehicles, an electric vehicle, a fuel cell vehicle, and/or any other mobility implement type of vehicle (e.g., bikes, scooters, etc.). The vehicle includes parts related to mobility, such as a powertrain with an engine, a transmission, a suspension, a driveshaft, and/or wheels, etc. The vehicle may be a non-autonomous vehicle or an autonomous vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one embodiment, the vehicle may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle. In one embodiment, a graphical user interface (GUI) may be integrated in the vehicle, which may include assisted driving vehicles such as autonomous vehicles, highly assisted driving (HAD), and advanced driving assistance systems (ADAS). Any of these assisted driving systems may be incorporated into the GUI. Alternatively, an assisted driving device may be included in the vehicle. The assisted driving device may include memory, a processor, and systems to communicate with the GUI. In one embodiment, the vehicle may be an HAD vehicle or an ADAS vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The vehicle may also include a completely driverless mode. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

Although certain methods have been described, it should be understood that other processes and/or modification of one or more of the described processes may also be possible in the context of the present disclosure.

V. Conclusion

Any connection described herein is to be understood in a way that the involved components are operationally coupled. Thus, the connection(s) can be direct or indirect with any number or combination of intervening elements, and there may be merely a functional relationship between the components.

Moreover, any of the methods, processes and actions described or illustrated herein may be implemented using executable instructions in a general-purpose or special-purpose processor(s) and stored on a computer-readable storage medium (e.g., disk, memory, or the like) to be executed by such processor(s).

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the disclosure on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The present disclosure has been described by means of example embodiments. It should be noted that there are alternative ways and variations which are obvious to a skilled person in the art and can be implemented without deviating from the scope of the present disclosure.

Many modifications and other embodiments of the present disclosure set forth herein will come to mind to one skilled in the art to which the present disclosure pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method, performed by at least one apparatus, comprising:
   obtaining fingerprints that have been collected by at least one mobile device for supporting a positioning of other mobile devices, each fingerprint comprising at least results of measurements on radio signals of at least one communication node at a particular location, communication node names proximate to the particular location, and an area identifier for the particular location;
   receiving, from a processor, a positioning request that contains at least a multiset of communication node names;
   selecting a radio model stored upon a server, wherein the radio model selected is based at least in part on the number of communication node names proximate to a fingerprint which match the node names in the positioning request that contains at least the multiset of communication node names; and
   generating data for a feedback for a user based on the selected radio model, wherein generating data for feedback comprises combining two or more radio models to provide a positioning estimate for a user, wherein the radio models to be combined are selected based at least in part on node names in the positioning request that contains at least the multiset of communication node names.

2. The method according to claim 1, wherein the radio model selected is based additionally, at least in part, on an area identifier associated with a physical location.

3. The method according to claim 1, further comprising estimating values of parameters defining at least one radio model for the at least one communication node based on the obtained fingerprints.

4. The method according to claim 1, further comprising determining the quality of the radio model by:
   determining an uncertainty of the estimated value of at least one of the parameters; and
   determining a quality of the radio model based on the determined uncertainty of the value of the at least one parameter.

5. The method according to claim 1, wherein the fingerprint comprises at least one of:
   a location of the communication node; and/or
   a transmission power used by the communication node;
   a received signal strength at a predetermined reference distance to the communication node; and/or
   a path loss exponent for signals transmitted by the communication node; and/or
   an average path loss of signals transmitted by the communication node.

6. The method according to claim 1, wherein generating data for a feedback for a user also comprises generating or updating a radio map.

7. The method according to claim 1, wherein generating data for a feedback for a user comprises generating feedback in the form of routing data for a vehicle or pedestrian.

8. The method according to claim 1, wherein generating data for a feedback for a user comprises generating feedback in the form of automated vehicle control.

9. The method according to claim 1, further comprising displaying a generated feedback upon an end user device.

10. The method according to claim 1, wherein the at least one communication node comprises at least one of:
    at least one terrestrial non-cellular transmitter; and/or
    at least one access point of at least one wireless local area network; and/or
    at least one Bluetooth transmitter; and/or
    at least one Bluetooth low energy transmitter; and/or
    wherein the at least one apparatus is or belongs to one of:
    the at least one mobile device; and
    a server that is configured to obtain and process sets of fingerprints from a plurality of mobile devices.

11. An apparatus comprising at least one processor and at least one memory including computer program code, the at least one memory and the computer program code configured to, with the at least one processor, cause the apparatus at least to:

obtain fingerprints that have been collected by at least one mobile device for supporting a positioning of other mobile devices, each fingerprint comprising at least results of measurements on radio signals of at least one communication node at a particular location, communication node names proximate to the particular location, and an area identifier for the particular location;

receive, from a processor, a positioning request that contains at least a multiset of communication node names;

select a radio model stored upon a server, wherein the radio model selected is based at least in part on the number of communication node names proximate to a fingerprint which match the node names in the positioning request that contains at least the multiset of communication node names; and generate data for a feedback for a user based on the selected radio model, wherein the data generated for feedback comprises combing two or more radio models to provide a positioning estimate for a user, wherein the radio models to be combined are selected based at least in part on a fingerprint.

12. The apparatus according to claim 11, wherein the radio model selected is based additionally, at least in part, on an area identifier associated with a physical location.

13. The apparatus according to claim 11, further configured to estimate values of parameters defining at least one radio model for the at least one communication node based on the obtained fingerprints.

14. The apparatus according to claim 11, further configured to determine the quality of a radio model by:

determining an uncertainty of the estimated value of at least one of the parameters; and determining a quality of the radio model based on the determined uncertainty of the value of the at least one parameter.

15. The apparatus according to claim 11, wherein data generated for a feedback for a user also comprises updated radio map data.

16. The apparatus according to claim 11, wherein data generated for a feedback for a user is displayed on an end user device.

17. The apparatus according to claim 11, wherein the fingerprint further comprises at least one of:

a location of the communication node; and/or a transmission power used by the communication node; and/or a received signal strength at a predetermined reference distance to the communication node; and/or a path loss exponent for signals transmitted by the communication node; and/or an average path loss of signals transmitted by the communication node.

\* \* \* \* \*